United States Patent [19]

Schäffer et al.

[11] Patent Number: 4,586,936
[45] Date of Patent: May 6, 1986

[54] FUEL BRIQUETS

[75] Inventors: Hans-Georg Schäffer, Aachen; Axel Vogts, Eschweiler; Günter Poppel, Düren-Niederau; Horst Schürmann, Düren, all of Fed. Rep. of Germany

[73] Assignee: Akzo N.V., Arnhem, Netherlands

[21] Appl. No.: 546,570

[22] Filed: Oct. 28, 1983

Related U.S. Application Data

[63] Continuation of Ser. No. 261,709, May 8, 1981, abandoned.

[30] Foreign Application Priority Data

May 8, 1980 [DE] Fed. Rep. of Germany ....... 3017599
Apr. 8, 1981 [DE] Fed. Rep. of Germany ....... 3114141

[51] Int. Cl.$^4$ ............................................... C10L 5/00
[52] U.S. Cl. ........................................ 44/10 C; 44/21; 44/23; 44/25; 428/425.1
[58] Field of Search ................. 44/10 C, 10 D, 21, 23, 44/25; 428/425.1

[56] References Cited

U.S. PATENT DOCUMENTS

| | | | |
|---|---|---|---|
| 3,145,928 | 8/1964 | Perry et al. | 44/1 R |
| 3,409,579 | 11/1968 | Robins | 260/30.4 |
| 3,971,764 | 7/1976 | Schurman | 428/425.1 |
| 4,167,398 | 9/1979 | Hughes | 44/17 |

FOREIGN PATENT DOCUMENTS

| | | | |
|---|---|---|---|
| 0707699 | 4/1965 | Canada | 44/25 |
| 50/151241 | 12/1975 | Japan | 44/21 |
| 0901789 | 7/1962 | United Kingdom | 44/25 |

OTHER PUBLICATIONS

Kirk-Othmer Encyclopedia of Chemical Technology, vol. 12, 2nd ed., Interscience Publishers, pp. 48–49.
Ibid. vol. 15, pp. 794–796.
The Encyclopedia of Chemistry, 3rd ed., Hanpel, C. A., Van Nostrand Reinhold Co., 1973, pp. 903–904.

*Primary Examiner*—William R. Dixon, Jr.
*Assistant Examiner*—Margaret B. Medley
*Attorney, Agent, or Firm*—Michael J. Striker

[57] ABSTRACT

Fuel briquettes containing binding agents and additives, obtained by briquetting 80-99% by weight of an essentially solid fuel, 0.1-19% by weight of a natural or synthetic binding agent and 0.1-10% of a cationic polyurethane obtained by a monomeric aliphatic dihydroxy compound, which has at one of its two atoms bonding the two dihydroxy groups an aliphatic residue with minimum 10 carbon atoms, being reacted with a polyisocyanate and an aliphatic monomeric diol containing tertiary nitrogen which in the obtaining of the cationic polyurethane is rearranged into its ammonium phase, or obtained by reacting the monomeric aliphatic dihydroxy compound with a polyisocyanate and an appropriate aliphatic monomeric diol in which the nitrogen is present already in its ammonium state. The briquets are obtained by commingling and forming into briquets, in a known manner, the mentioned components. Preferred embodiments include use of charcoal or brown coal as solid fuel; use of brown coal containing 5-10% of a natural constituent as binding agent; the natural constituent being bitumen; colding mixing the comminuted fuel, binding agent and cationic polyurethane; and use of polyvinyl alcohol as synthetic binding agent, particularly having a viscosity from 0.003 Pas to 0.07 Pas, and particularly with a weight ratio of cationic polyurethane to polyvinyl alcohol from 1:3 to 3:1.

9 Claims, No Drawings

FUEL BRIQUETS

This is a continuation of application Ser. No. 261,709, filed May 8, 1981, abandoned.

The invention relates to briquets on the basis of fuels such as hard coal, coke, brown coal, charcoal, etc., obtained by briquetting in the presence of a binding agent and by use of a further additive, wherein however the binding agent may already be present by nature as is the case with many types of brown coal, or will be admixed in addition to the further additive.

It is known how to produce briquets from, respectively, pulverized material or such with fine or coarse granules by compressing. In shaping by briquetting, a difference is made between binderless methods and briquetting with the addition of organic or inorganic binding agents.

Addition of a binding agent is intended to obtain improved briquetting characteristics of the pressing stock during briquetting, f.i. to enable plasticity during the shaping process, on the other hand, the binding agent should also raise the cohesion of the briquetted material so that better handling of the briquets will be possible. An added binding agent should above all, also produce a favorable effect upon the properties of the briquets, such as strength, stability in burning, high thermal efficiency in combustion, smoke generation, etc.

Numerous binding agents have already become known, which are used in briquetting coke, anthracite, semibituminous and gas coals etc. The briquets known hitherto, and the processes for their production are, however, of disadvantage in many respects. Using, for instance, pitch or asphalt-derived bitumen as binding agent will produce briquets which upon combustion will generate heavy smoke and, due to melting of the binding agent, disintegrate too fast. This will also, inter alia, result in the available material not being utilized fully during combustion and by great quantities of uncombusted carbon being provable in the ashes. It may thus occur that up to approximately 60% of the carbon will yet remain in the ashes and will then be lost as waste, or require a cumbersome process for its recovery.

Hard-coal tar pitch as binding agent is of the disadvantage that it may possibly contain carcinogenous substances; its use should therefore be avoided as far as possible. Use of pitch as binding agent in briquets intended for domestic heating is therefore prohibited on environmental grounds.

Beyond the aforegoing, there are a number of brown coals which are readily briquettable without requiring an additional binding agent, since these brown coals contain by nature ca. 5 to 10% organic constituents, which are effective as binding agents. The mechanical properties of such briquets are, however, inadequate for special applications; difficulties will particularly arise when using these briquets for coking.

In DE allowed application No. 1 186 825, sulfite waste liquor obtained in cellulose production is recommended as binding agent, but it must be processed with the coal by a special method. Apart from the binding agent itself, 0.1% to 1% of an oil may be admixed to the briquetting stock as further additive.

Although a considerable range of briquets containing, apart from fuel, also binding agents, has become known, as have appropriate processes for their manufacture, the need still exists for improved processes to produce briquets from fuels such as coal, coke, charcoal, brown coal etc., and also for briquets of the aforegoing type having improved properties.

It is therefore the objective of the invention to make available briquets produced from fuels in the presence of binding agents, said briquets being reduced in their smoke, allowing good handling without thereby causing noteworthy breakage or formation of dust or fine granules, and possessing good cold strength and a particularly high stability on burning. A further objective of the invention are fuel briquets distinguished by highly efficient combustion and yielding an ash containing no, or only negligible, quantities of uncombusted constituents, allowing good coking and resulting in a coke of outstanding mechanical properties, suitable for manifold applications.

It is a still further objective of the invention to make available an advantageous process allowing with simple briquetting techniques the production of improved, binding-agent containing briquets, such process being applicable to the processing of practically all essentially solid fuels, particularly flaming coal, gas coal, semibituminous coal, forge coal, anthracite, coke, brown coal, charcoal, etc, said process furthermore, allowing the use of the most different binding agents and also being implementable on customary briquetting apparatus.

This objective is attained by fuel briquets containing binding agents and additives, and obtained by briquetting of approximately 80 to 99% by weight of an essentially solid fuel, approximately 0.1 to 19% by weight at a natural or synthetic binding agent and approximately 0.1 to 10% by weight of a cationic polyurethane obtained by a monomeric aliphatic dihydroxy compound, which has at one of its two atoms bonding the two dihydroxy groups an aliphatic residue with a minimum 10 carbon atoms, being reacted with a polyisocyanate and an aliphatic monomeric diol containing teritary nitrogen which in the obtaining of said cationic polyurethane is rearranged into its ammonium state; or obtained by reacting the aforesaid monomeric aliphatic dihydroxy compound with a polyisocyanate and an appropriate aliphatic monomeric diol in which the nitrogen is present already in its ammonium phase. The fuel briquets may also contain 80 to 99% by weight of charcoal, 80 to 99% by weight of brown coal, wherein it is also practicable to use a brown coal containing already in natural state 5 to 10% of a natural constituent acting as binding agent.

The fuel briquets will preferably contain a binding agent on a bituminous basis. Very advantageous are also fuel briquets as per invention, containing 80 to 99% coke or brown coal coke.

For producting these briquets, use may be made of a process, characterized by the commingling and forming into briquets in the manner known per se, of a quantity of approximately 80 to 99% by weight of a comminuted fuel, of approximately 0.1 to 19% by weight of a natural or synthetic binding agent and of 0.1 to 10% by weight of a cationic polyurethane obtained by a monomeric aliphatic dihydroxy compound having at one of its two atoms bonding the two dihydroxy groups, an aliphatic residue with minumum 10 carbon atoms, being reacted with a polyisocyanate and an aliphatic monomeric diol containing tertiary nitrogen which in the obtaining said cationic polyurethane is rearranged into its ammonium phase, or by reacting aforesaid monomeric aliphatic dihydroxy compound with a polyisocyanate and an appropriate aliphatic monomeric diol in which the nitrogen is present already in its ammonium phase.

It is particularly advantageous if the comminuted fuel, the binding agent and the cationic polyurethane are mixed in cold state. The briquets obtained in this manner are outstandingly suitable for coking.

The cationic polyurethanes used as per invention as additives, are produceable by a monomeric, aliphatic dihydroxy compound having its hydroxyl group bonded in the aliphatic chain by maximum 7 atoms being reacted with a polyisocyanate and an aliphatic monomeric diol containing tertiary nitrogen, and by rearranging the tertiary nitrogen, partially or in total, into the ammonium phase by treatment with an acid or a quaternating agent. Instead of using the monomeric diol with a tertiary nitrogen atom and subsequent rearranging into the ammonium phase, use may also be made of an appropriate monomeric diol the nitrogen of which has already been rearranged, partially or in total, into the ammonium phase. In the production of these cationic polyurethanes, a precursor adduct containing NCO-end groups may first be produced by reacting the dihydroxy compound wth a polyisocyanate, said precursor adduct then being subjected to an extending of its chain; it is also practicable to effect reaction of the starting constituents in a so-called one-pot process.

Monoesters of glycerol fatty acid esters, such as glycerol monostearate, or aliphatic compounds such as N-stearyldiethanolamine, 1,2- or 3,4-dihydroxyoctadecane are particularly suitable as monomeric aliphatic dihydroxy compound.

The cationic polyurethanes used as per invention, and also the corresponding production processes are described more closely in the German published application No. 2 400 490 of Jan. 5, 1974, express reference to which is being made herein.

The cationic polyurethanes may be used as dry substance or, respectively, aqueous solution or dispersion of the most varied concentrations. Suitable are, for instance aqueous solutions or, respectively, dispersions, containing 15 to 30% by weight of the cationic polyurethane.

Mixing of the comminuted, essentially solid, fuel, i.e. the fuel in the form of smaller particulates such as granules, breeze, dust, or similar, of the binding agent and the additive, may be performed in the manner as usual per se. The additive may be deposited on the briquetting stock, i.e. on a prepared mixture of fuel and binding agent, by spraying or through a nozzle. It is also practicable to commingle all three constituents simultaneously. It is particularly advantageous to perform mixing in cold state. Mixing may be performed in customary mixers, agitators or kneaders.

As per invention, the most different types of fuel materials can be used. Hard coal of any type is briquettable, such as flaming coal, gas and semibituminous coal, forge coal, anthracite, etc; brown coals of the most different origin are particularly suitable. Charcoal too, is very suitable within the scope of the invention.

It was particularly unexpected, that the invention would yield briquets very much reduced in smoke. Production of the briquets may be implemented with simple briquetting techniques and application of special processing techniques is not required. The briquetting stock may thus be molded on customary machines that may already be available. Suitable briquetting machines are, for instance, roll presses, ring roll presses, extruders, etc.

It is particularly noteworthy that the strengths of the obtained briquets are very good, so that handling of the briquets will present no difficulties and there will be a reduction in breakage and concomitant formation of fines and dust. Compressive strength is excellent. Particularly unexpected was the excellent stability in burning of the briquets as per invention. In a particularly advantageous embodiment of the invention, use is made of polyvinyl alcohol as synthetic binding agent in briquetting. A particularly suitable weight ratio of cationic polyurethane to polyvinyl alcohol is, therein, 1:3 to 3:1. The viscosity of the polyvinyl alcohol is preferable 0.003 to 0.07 Pa.s, viscosity being determined with a 4% aqueous solution at 20° C. Suitable for the production of such fuel briquets are commercially available polyvinyl alcohols, generally produced by saponification of polyvinyl acetate. Use may be made of polyvinyl alcohols of the most different degrees of polymerization or, respectively, viscosities. The viscosities quoted within the scope of the invention are determined with a 4% aqueous solution at 20° C. Particularly suitable are fully saponified polyvinyl alcohols.

Commerically available polyvinyl alcohols, suitable within the scope of the invention, are f.i. distributed by the firm Hoechst AG under the brand name "MOWIOL". In the firms leaflets "B1 Das Mowiol Sortiment" and "A1 Zur Geschichte des Mowiol" (Messrs. Hoechst AG G 1103 Edition September 1976) as available on the day of filing, such polyvinyl alcohols are being described more closely.

Processing of the solid fuel, the cationic polyurethane and the polyvinyl alcohol as synthetic binding agent, may be implemented in a manner as previously described. The invention allows the production of fuel briquets from usual solid fuel, of particular advantage are, however, briquets on the basis of hard coal, especially anthracite. Such briquets have high cold stability.

These advantages of the invention are attained by using cationic polyurethane and polyvinyl alcohol as synthetic binding agent. It is not required to use still further binding agents. It is, however, readily practicable to use in conjunction with the above named additive constituents, also further binding agents either of a natural or synthetic type.

It was particularly unexpected, that as per this embodiment, fuel briquets are obtained having outstanding mechanical properties, being extremely low in smoke and of a high thermal yield. A particular improvement will result in the cold strength of the briquets, so that fuel briquets become available, having good handling qualities at normal temperatures as well as at higher temperatures. The invention also makes it practicable to manage with very small quantities of binding agent and additives; it will frequently suffice if a total of only 1% by weight of additives and binding agents are added to the solid fuel. Even smaller quantities can yet produce an effect.

It is not necessary to use great quantities of binding agents, in many instances it will even be possible to manage with smaller quantities than had been the case hitherto. It is thus possible, f.i. in briquetting hard coal, to reduce by several percent the content of added bitumen.

It is a further advantage that it is not required for the moisture content of the coals to be considerably reduced prior to briquetting. It is basically practicable to process briquets with a moisture content above 1.5%; in many instances, briquetting will be practicable even of coal having a considerable higher moisture content, i.e. up to 20%.

In coals having a relatively high moisture content, such as brown coal that has been predried only to a small degree, f.i. to approximately 20% moisture, admixing the additive as per invention will also considerably increase the wettability, so that the applied binding agent will more uniformly disperse on the coal particles. Addition of agents such as caustic lye or acids, frequently applied to increase wettability, will thus not be needed.

It was particularly unexpected that any type of coal may be processed as per this invention. It is possible herein to process a single type of coal by itself. Commingling of different types of coal will thus not be required any longer, as was frequently the case hitherto, when, in order to obtain durable briquets, a second type of coal, such as for instance gas coal, has to be added to coal types that would not readily lend themselves to briquetting.

No obnoxious odors will develop upon combustion. Binding agents and additives are very well dispersable on the coals and undesirable agglomerations will not occur. Only short mixing period are required. Processing of the additive is not dangerous.

It is practicable to process fine granulate as well as coarse granulate either separately or conjointly in a mixture. Use of coal dust is possible. The resistance of the briquets to weathering is also satisfactory.

Upon combustion and in other fields of application, the briquets will result in reduced quantities of slag. It is particularly unexpected that the briquets evidence a considerably higher degree of yield or, respectively, higher efficiency. The content of combustibles in material dropping through the grate on stoking is considerably reduced.

Briquets as per this invention are particularly suitable for use in coking, where the excellent mechanical properties will prove to be of benefit particularly at the high temperatures prevailing therein. The coke resulting from coking the briquets as per this invention has higher properties as to strength and is suitable for mainfold applications.

The invention will be explained more closely by the following examples:

EXAMPLE 1

Production of a cationic polyurethane used as additive

Used as apparatus herein is a heatable three-necked round flask of 500 ml capacity, provided with stirrer, reflux cooler with drying tubes as well as separating funnel.

19.5 g glycerol monostearate of commercial grade (0.0545 mol) are first introduced into the flask. Thereupon, filling is made in succession of 15 mg dibutyl tin diacetate, 24 ml of anhydrous aceton and 16.0 of ml (19.5 g) of a mixture from toluylenediisocyanate-(2.4) and -(2.6) (00.20) (0.112 mol) into the flask.

The reaction vessle is then heated with stirring for 30 mins. until a weak reflux of the solvent. During this time, the reaction temperature is approximately 65° C.

The solution of 6.5 g N-methyldiethanolamine (0.0546 mol) in 20 ml anhydrous aceton is dripped in within 10 mins., and heating subsequently resumed, so that moderate reflux is maintained.

After 60 mins. reaction time, the NCO content has fallen to below 1.5% and a moderately viscous, water-clear solution of the polyurethane has resulted which is diluted by the addition of 160 ml technical grade aceton.

For halogenation, 27.3 ml of a 2-normal hydrochloric acid are added within approximately 5 mins. The salt will then be present partially colloidal and partially as a white precipitation which is brought to dissolving by feeding 140 ml water within 15 mins. whilst maintaining the contents of the flask at a temperature of approximately 50° C.

The resulting clear solution is freed from aceton by vacuum distillation.

The result is a weakly opalescent, slightly yellow-colored solution of 20% by weight polyurethane monomer. Further distilling-off of water allows increasing the concentration. At 32% by weight, the polymer solution will still be free-flowing.

EXAMPLE 2

Briquetting of hard coal 93 parts of a finely granulated mixture of anthracite and forge coal (granulated up to 3 mm), 5 parts bitumen, and 2 parts of polyurethane as per Example 1, calculated on a dry basis but used herein as 20% by weight aqueous solution, are commingled in a mixer at room temperature. The mixture is subsequently heated in a kneader arranged after the mixer, to approximately 130° C. The briquetting stock prepared in this manner is then compressed in the usual way in roll presses. The still hot briquets are subsequently stored for about 30 minutes to allow hardening and cooling. The briquets produced in this manner will have a strength that is 30% higher than briquets produced without cationic polyurethane having been added as per invention.

EXAMPLE 3

Briquetting of brown coal

Brown coal is dried to a moisture content of 17% and prepared by grinding to a granulation from 0 to 6 mm. After adding of 3%, calculated on a dry basis, of a cationic polyurethane as per example 1, mixing and heating, the mixture is being shaped into briquets on a conventional extruder. After extruding, the briquets are stored for approximately 6 hours to cool. The strengths of the brown coal briquets have been improved up to 50% relative to briquets produced without cationic polyurethane having been added as per invention.

EXAMPLE 4

Briquetting of charcoal

As is customary with hard coal, charcoal is comminuted by grinding to a granulation from 0 to 10 mm. Subsequently, 80 parts charcoal, 18 parts bitumen and 2 parts, calculated on dry basis, of cationic polyurethane as per Example 1, are commingled and shaped into briquets in a roll press. After pressing, the briquets are stored for about 0.5 hrs to cool. The briquets show improved strengths.

EXAMPLE 5

Briquetting of coke breeze 88 parts coke breeze, 10 parts bitumen and 2 parts, calculated on a dry basis, of cationic polyurethane as per Example 1, are commingled and pressed at a temperature of 130° C. into briquets on roll presses. After cooling and storing the briquets will have an improved strength relative to coke briquets that were produced without cationic polyurethane having been added as per invention.

EXAMPLE 6

Successive filling into a mixer is effected of 100 kg anthracite briquetting coal 1 kg of a cationic polyurethane as per Example 1 and 2 kg of a fully saponified polyvinyl alcohol of the type MOWIOL 4-98 with a viscosity of abt. 4 cP (=0.004 Pa.s), (commercial product, available on the day of filing from Messrs. Hoechst AG).

The above parts are intimately commingled for 5 minutes and fed into a dual-roll press. Prior to briquetting, the mixture will be heated by steam for a brief period.

The briquets obtained herein will produce particularly little smoke upon combustion, the values of strength are after 20 minutes at about 80 dN/cm$^2$. The material dropping through the grate will have a low carbon content.

EXAMPLE 7

Combination within a stirring vessel is made of 0.5 kg of polyurethane as used in example 6 and 0.5 kg of polyvinyl alcohol as used in Example 6. Both components are stirred until a homogenous mixture has been attained.

This mixture is added in portions to 100 kg anthracite previously brought to the usual site distribution. After intimate mixing in a kneader, the coal is treated with steam at 100° C. in a dual-roll press and briquetted.

Solid briquets are obtained after a brief curing time and are distinguished by being particularly low in smoke.

We claim:

1. Fuel briquets based upon fuels such as flaming coal, gas coal, semibutiminous coal, forge coal, anthracite, coke, brown coal or charcoal, containing binding agents and additives, obtained by briquetting of 80 to 99% by weight of an essential solid fuel, 0.1 to 19% by weight of a binding agent and 0.1 to 10% by weight of a cationic polyurethane obtained by a monomeric aliphatic dihydroxy compound, which displays at one of the atoms bound to the two dihydroxy groups an aliphatic residue with minimum 10 carbon atoms, being reacted with a polyisocyanate and an aliphatic monomeric diol containing tertiary nitrogen which in the obtaining of said cationic polyurethane is rearranged into its ammonium state; or obtained by reacting aforesaid monomeric aliphatic dihydroxy compound with a polyisocyanate and an appropriate aliphatic monomeric diol in which the nitrogen is present already in its ammonium state.

2. Fuel briquets containing binding agents according to claim 1, containing 80 to 99% by weight of charcoal.

3. Fuel briquets containing binding agents according to claim 1, characterized by 80 to 99% brown coal.

4. Fuel briquets containing binding agents according to claim 1, characterized by a brown coal containing, already in its natural state, a proportion of 5 to 10 percent of a natural constituent as binding agent.

5. Fuel briquets containing binding agents according to claim 1 characterized by a binding agent based on bitumen.

6. Fuel briquets containing binding agents according to claim 1, characterized by polyvinyl alcohol as synthetic binding agent.

7. Fuel briquets according to claim 6, characterized by a weight ratio of cationic polyurethane to polyvinyl alcohol from 1:3 to 3:1.

8. Fuel briquets according to claim 6, characterized by a polyvinyl alcohol of a viscosity from 0.003 Pa.s to 0.07 Pa.s.

9. Fuel briquets according to claim 6, wherein the polyvinyl alcohol is a fully saponified polyvinyl alcohol.

* * * * *